United States Patent [19]

Watanabe et al.

[11] Patent Number: 4,481,450

[45] Date of Patent: Nov. 6, 1984

[54] SYSTEM FOR CONTROLLING A VEHICLE WINDOW AND THE LIKE

[75] Inventors: Takashi Watanabe, Kariya; Yoshihiro Sasage, Aichi; Hideaki Kato, Nagoya, all of Japan

[73] Assignee: Nippondenso Co., Ltd., Kariya, Japan

[21] Appl. No.: 480,127

[22] Filed: Mar. 29, 1983

[30] Foreign Application Priority Data

Apr. 2, 1982 [JP] Japan .................................. 57-55696

[51] Int. Cl.$^3$ ............................................. H02P 1/04

[52] U.S. Cl. .................................... 318/444; 318/480; 318/DIG. 2; 15/250 C

[58] Field of Search ............... 318/280, 483, 313, 480, 318/444, 466, 443, DIG. 2; 324/58.5 B; 315/77, 82; 200/61.05; 15/250.17, 250 C, 250.12

[56] References Cited

U.S. PATENT DOCUMENTS

| | | | |
|---|---|---|---|
| 3,307,095 | 2/1967 | Redmond, Jr. | 200/61.05 X |
| 3,689,814 | 9/1972 | Holt | 318/466 X |
| 4,355,271 | 10/1982 | Noack | 318/480 |
| 4,394,605 | 7/1983 | Terazawa | 318/256 |

*Primary Examiner*—J. V. Truhe
*Assistant Examiner*—Bentsu Ro
*Attorney, Agent, or Firm*—Cushman, Darby & Cushman

[57] ABSTRACT

For use in a motor vehicle having a windshield, a control system comprises a raindrop sensor which emits a beam of radiation into a section of the windshield from the inner surface thereof at such an angle of incidence that the beam reflects off the outer surface and detects the reflected beam to convert it into a first signal. The first signal is compared with a reference value to generate a second signal. A motor control circuit is responsive to the second signal for closing a window of the vehicle.

19 Claims, 6 Drawing Figures

SYSTEM FOR CONTROLLING A VEHICLE WINDOW AND THE LIKE

BACKGROUND OF THE INVENTION

The present invention relates to a vehicle-mounted control system for automatically closing a motor-driven window and the like in response to raindrops.

Conventional motor-driven window regulators are responsive to a manually operated switch. Automatic closure of a vehicle window is one of desired features of a motor vehicle. Reliable raindrop sensors are required to meet this demand.

U.S. Pat. No. 4,394,605 (invented by H. Terazawa and assigned to the same assignee as the present invention and titled "Load Drive Control System") discloses a wiper control system which senses raindrops to automatically initiate wiper operation.

SUMMARY OF THE INVENTION

An object of the present invention is to provide a control system which comprises first means for emitting a beam of radiation into a section of the windshield of a vehicle from the inner surface thereof at such an angle of incidence that the beam reflects off the outer surface of the windshield, second means for detecting and converting the reflected beam into a first signal, third means for comparing the first signal with a reference value to generate a second signal, and fourth means responsive to the second signal for closing a window of the vehicle.

The system further comprises manually operated switching means having first and second circuit conditions for opening and closing said window, respectively. According to a feature of the invention, the fourth means comprises a reversible motor for driving the window in closing and opening directions in response to the first and second circuit conditions, respectively, means for detecting when a current flowing through the motor is higher than a predetermined value to generate an output signal, first control means responsive to the second signal and to the first circuit condition for energizing the motor in the window closing direction and responsive to the output signal for de-energizing the motor, and second control means responsive to the second circuit condition for energizing the motor in the window opening direction and responsive to the output signal for de-energizing the motor. According to this feature, the window is automatically stopped as it moves in the closing direction if this movement is hampered by an elbow of the vehicle occupant to reduce the element of danger.

According to a further feature of the invention, the system includes a window-operated switch arranged to be operated when the window is fully closed to cut off the power circuit for power saving purpose.

According to a still further feature of the invention, an indicator is provided to alert the occupant when the window is moving.

The control system is preferably switched from automatic mode to manual mode by means of a manually operated switch to render the system to responsive exclusively to manual control.

BRIEF DESCRIPTION OF THE DRAWINGS

The present invention will be described in further detail with reference to the accompanying drawings, in which.

DETAILED DESCRIPTION

Figure 1:
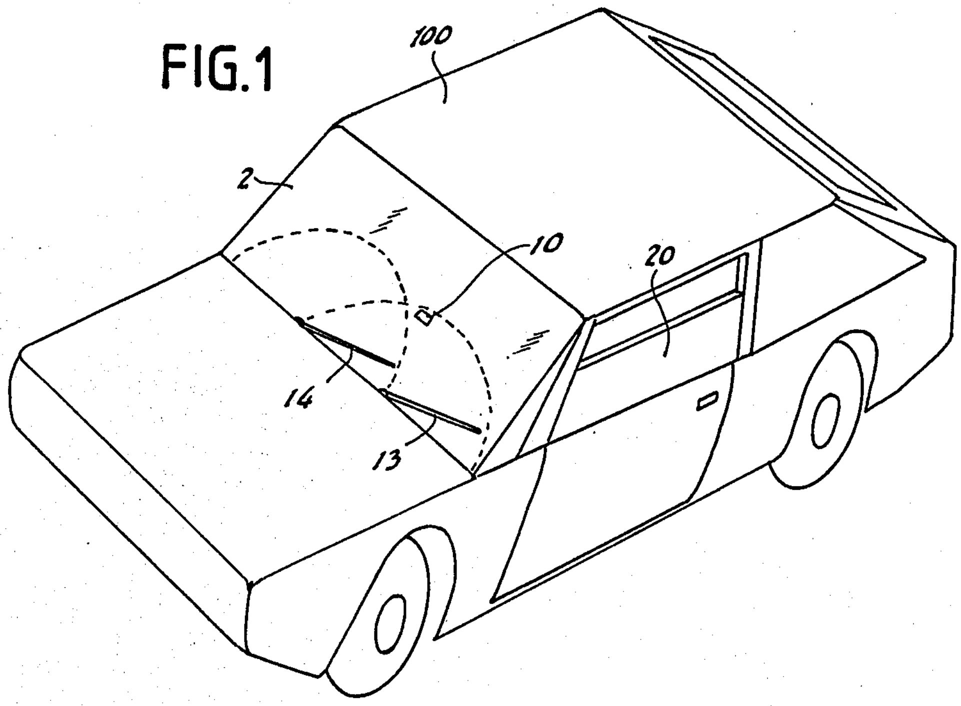
FIG. 1 is a perspective view of an automotive vehicle with a raindrop sensor shown mounted behind the windshield.

Referring now to FIG. 1, a rain-drop sensor 10 is secured to the windshield of an automotive vehicle 100 having a pair of side windows 20 which are opened or closed by a manually operated crank handle and at least one of which is automatically closed in response to a signal derived from the raindrop sensor 10 in a manner as will be described. The raindrop sensor 10 is mounted on the inner side of a glass windshield 2.

Figure 2:
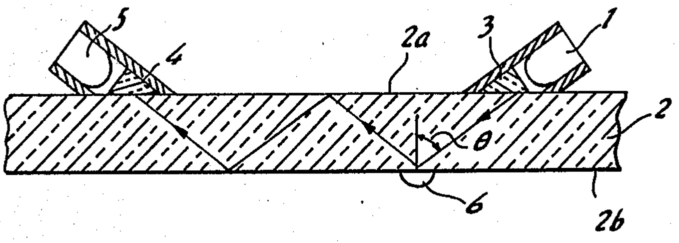
FIG. 2 is an illustration of a raindrop sensor incorporated in the control system of the invention.

As schematically illustrated in FIG. 2, the raindrop sensor 10 comprises a pair of transparent fixing members 3 and 4 attached to the inner surface *2a* of the windshield 2. Each of the fixing members is preferably formed of the same material as the windshield 2 and has a surface normal to the direction of light passing therethrough. A light-emitting diode 1 is located adjacent the fixing member 3 to direct a beam of light pulses into the windshield 2 at an angle $\theta$ to the vertical which is greater than the critical angle $\theta_1$ at which total reflection occurs between glass and air but smaller than the critical angle $\theta_2$ at which total reflection occurs between glass and water. Typical values of $\theta_1$ and $\theta_2$ are 41.1° and 61.1°, respectively. The incident light is totally internally reflected on the outer surface *2b* of the windshield and bounces back to the inner surface as it advances through a section of the windshield 2 to the other fixing member 4. A light sensitive member, or a photodiode 5, is mounted adjacent the fixing member 4 to generate a signal when it receives the light pulses. It will be seen therefore that if there is a raindrop as shown at 6 on the outer surface *2b* of the windshield, the total reflection is lost at this particular portion and there is a corresponding reduction in the signal detected by the photodiode 5.

Figure 3:
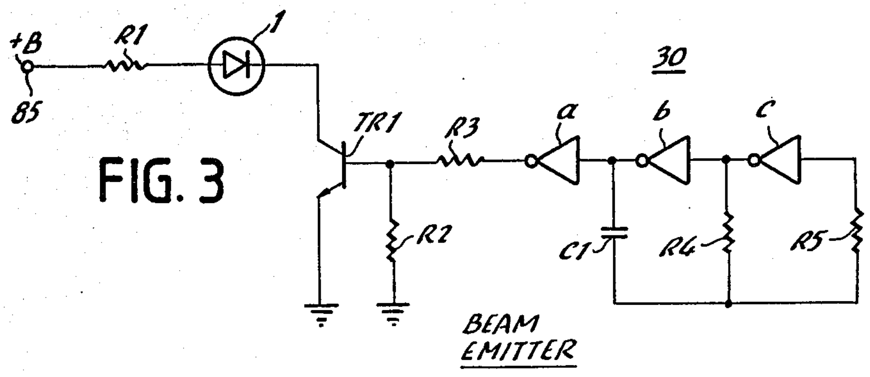
FIG. 3 is a circuit diagram of a modulator associated with the raindrop sensor.

The light-emitting diode 1 is activated by a modulator circuit 30 shown in FIG. 3. This circuit comprises an oscillator formed by inverters a, b, c, resistors R4, R5 and a capacitor C1. The oscillator output is coupled by resistors R2, R3 to the base of a switching transistor TR1 having its collector-emitter path connected in series with the light-emitting diode 1 between ground and a voltabge supply terminal +V via a resistor R1. The frequency of the oscillator is determined so that the light pulses injected into the windshield may be clearly distinguished by the photodiode 5 from light rays emitted from environments such as street lights.

Figure 4:
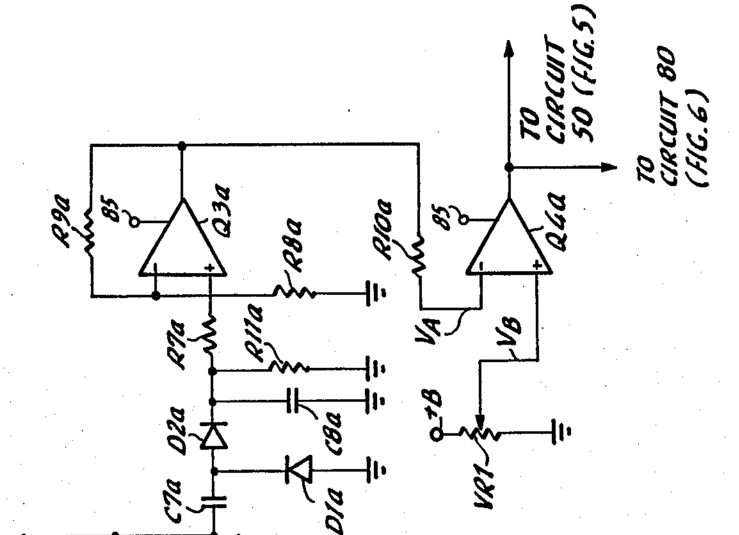
FIG. 4 is a circuit diagram of a receiver associated with the raindrop sensor.
Figure 4:
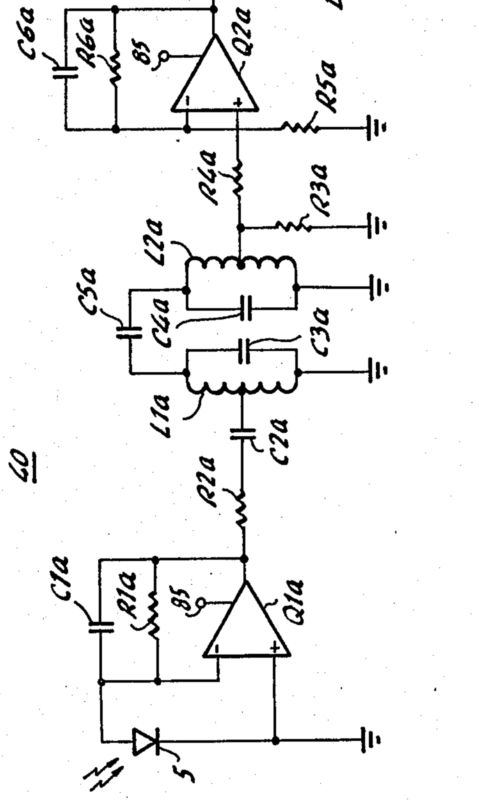

The output signal from the photodetector 5 is applied to a receiver circuit 40 shown in FIG. 4. The receiver comprises a current-to-voltage converter formed by an operational amplifier Q1*a*, a capacitor C1*a* and a resistor R1*a*, and a band-pass filter formed by capacitors C3*a*, C4*a*, C5*a* and coils L1*a*, L2*a*. The band-pass filter rejects the noise component of the voltage signal and passes the component representing the intensity-modulated light. The output of the band-pass filter is applied to an operational amplifier Q2*a* for linear amplification. Diodes D1*a*, D2*a* rectify the amplified signal and a capacitor C8*a* and a resistor R11*a* forms a smoothing circuit to convert the signal into a DC voltage which is amplified by a DC amplifier Q3*a*. Further included is an operational amplifier Q4*a* having its inverting input coupled to the output of DC amplifier Q3*a* and its noninverting input coupled to the tap of a variable resistor VR1. The amplifier Q4*a* acts as a comparator to compare the output of the raindrop indicating DC signal with a reference setting determined by the variable resistor VR1.

Under fine weather conditions, the transparent medium 10 provides total internal reflection, so that the rain-drop DC signal is higher than the reference setting and the comparator Q4*a* generates a low level output. Under rainy conditions, the total internal reflection is partially or completely lost and the DC signal reduces in proportion to the amount of raindrops to a level lower than the reference setting, so that the comparator Q4*a* switches to a high level output state.

Figure 5:
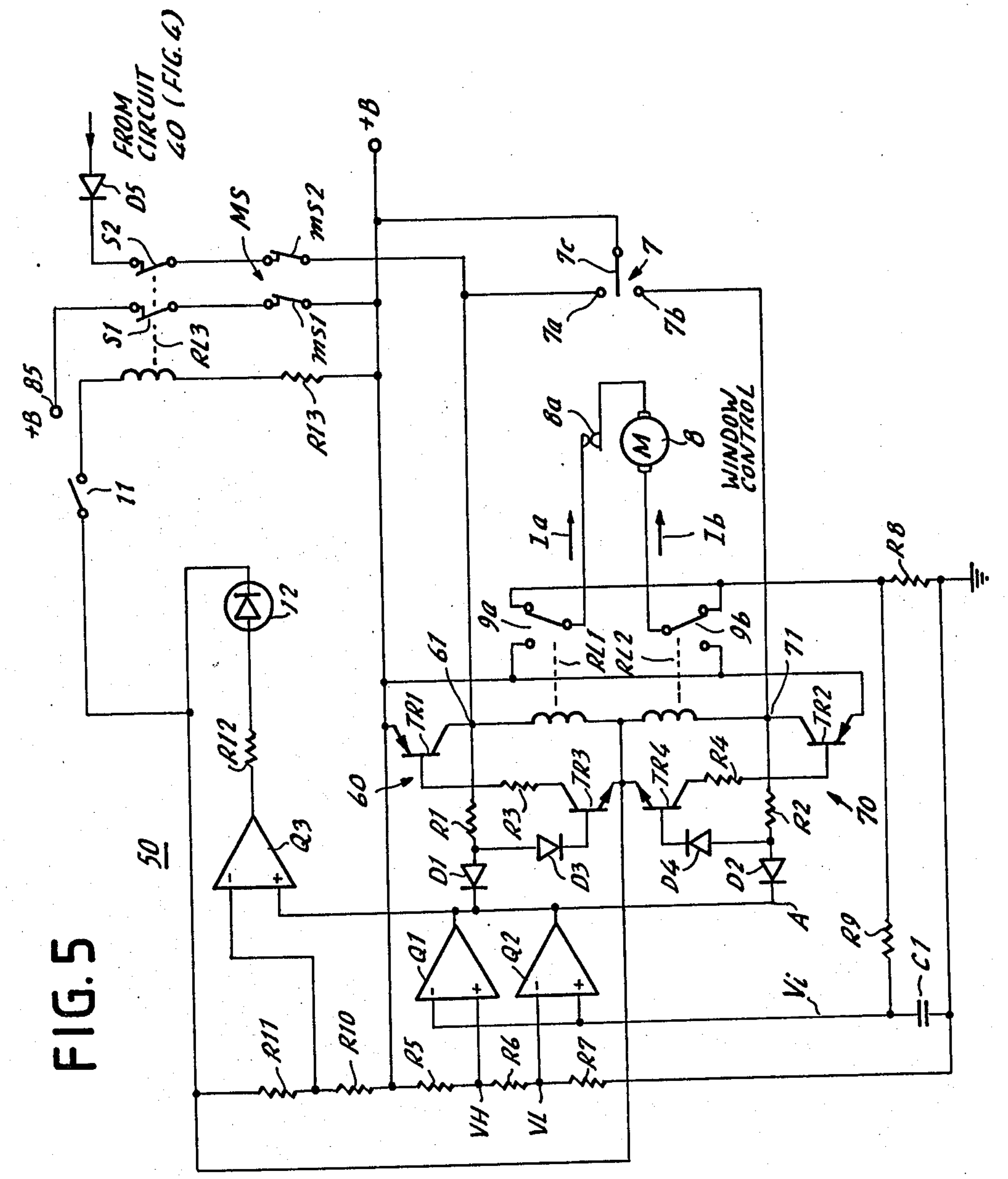
FIG. 5 is a circuit diagram of a window control unit.

The output of the receiver circuit 40 is applied to the input of a window control unit 50 shown in FIG. 5. The control circuit 50 includes a manually operated switch 7 having a pair of stationary contacts *7a*, *7b* and a moving contact arm *7c* which normally remains disengaged from contact with either of the stationary contacts. This switch 7 is loated in an easily accessible position such as a vehicle door or the instrument panel to allow the vehicle occupant to manually override the automatic window control system. When the vehicle occupant desires to close the window 20, the contacts *7a* and *7c* are brought into contact to apply a voltage +B to a window-close circuit 60, and when he desires to open the window, the contacts *7b* and *7c* are brought into contact to apply the voltage =B to a window-open circuit 70.

The window 20 is driven by a window drive motor 8 of a reversible type having a normally closed temperature responsive switch *8a* to de-energize the motor 8 when it is heated to an abnormally high temperature. The motor 8 has such a loading characteristic that it requires a current of a few amperes under light loads as when the window is moving up or down and a current of several tens of amperes under heavy loads as when the window is pressed against the frame in a fully open or closed position or when external force is exerted upon it while moving in either direction. The motor 8 is supplied with a current Ia when the window is raised or an opposite current Ib when the window is lowered, the currents Ia and Ib being supplied from the window-closing circuit 60 and the window-opening circuit 70, respectively.

The window-closing circuit 60 comprises a relay RL1 having associated contacts *9a*, and a relay holding circuit formed by transistors TR1 and TR3. The coil of the relay RL1 is energized by a current which is supplied from the output of the receiver 40 through a diode D5 or energized by a current supplied through the manual switch 7 from the voltage source at +B. When this relay is energized so that the current Ia flows from the +B voltage source through the normally open contacts *9a*, temperature responsive switch *8a*, motor 8, the normally closed contacts *9b* of the relay RL2 and a current sensing resistor R8 to ground.

The window-opening circuit 70 comprises a relay RL2 having contacts *9b* and a relay holding circuit formed by transistors TR2 and TR4. The coil of window-opening relay RL2 is connected to the contact *7b* of switch 7 to be energized by the voltage +B. The relay contacts *9a* and *9b* the window-closing and window-opening relays are operated so that they are mutually exclusively connected to the motor 8.

The resistor R8 has a resistance value of about 10 ohms to provide as small a dissipation of Joule's heat as possible by the current of substantial magnitude, but provides a voltage sufficient to be compared with reference voltages to be described hereinbelow.

The resistor R8 develops a voltage Vi proportional to the motor current and therefore indicates whether the window is moving or pressed against the window frame either in the fully open or fully closed position. The voltage Vi, after having been filtered through an RC noise filter formed by a resistor R9 and a capacitor C1, is applied to a window comparator including a pair of operational amplifiers Q1 and Q2. Specifically, the RC filter has such a time constant value that it introduces a delay time of a few hundreds milliseconds in response to a step change in voltage cross the resistor R8 to remove unwanted high frequency components which arises from external light.

High and low reference voltages $V_H$ and $V_L$ are provided by a series circuit of resistors R5, R6 and R7 connected between voltage terminal +B and ground. The operational amplifier Q1 compares the motor-current indicative voltage Vi with the higher reference $V_H$ and generates a low level output when Vi is higher than $V_H$ and switches to an open level state when Vi is lower than $V_H$. On the other hand, the operational amplifier Q2 compares the voltage Vi with the lower reference $V_L$ and generates a low level output when Vi is lower than $V_L$ and switches to an open level state when Vi is higher than $V_L$. Therefore, when the window is moving upward or downward, the window comparator is in an open level state. If a positive voltage is present at a circuit junction 61 between the coil of relay RL1 and transistor TR1, a current will flow through a resistor R1 and a diode D3 to the base of transistor TR3, thus turning it on. This in turn biases the transistor TR1 through a resistor R3 into conduction. By the turn-on of transistor TR1, the collector current of this transistor holds the relay RL1 energized once operated in response to the potential at the circuit junction 61.

On the other hand, if a positive potential is present at a circuit junction 71 between the coil of relay RL2 and transistor TR2, transistor TR4 is biased into conduction by a current passing through a resistor R2 and a diode D4, causing transistor TR4 to turn on to hold the relay RL2 energized once operated by the potential at the junction 71. Diodes D1 and D2 are provided to keep the circuits 60 and 70 from interferring with each other due to unwanted sneak currents.

The operation of the window control circuit 50 is as follows. The relay RL1 is energized when contacts *7a* and *7c* are closed by the occupant or when the rain-drop signal is delivered from the receiver circuit 30, resulting in the closure of the contacts *9a* to cause the motor 8 to drive the window in the closing direction. As it starts rotating, the motor draws a current of a few amperes and the resistor R8 develops a corresponding voltage which is compared by the window comparator (Q1, Q2). The output of window comparator at terminal A thus switches to an open level state, causing transistors TR3 and TR1 to turn on successively to hold the relay RL1. Therefore, the motor 8 keeps running even though the switch 7 is released. If the window movement is impeded by the occupant or when the window reaches the fully closed position, the motor load and its current increases to several tens of amperes. The voltage across the resistor R8 correspondingly increases, so that the window comparator switches to a low output state. When this occurs, diose D1 is forwardly biased and the potential at the base of transistor TR3 finds a low impedance path through the diode D1 to turn transistors TR3 and TR1 off, de-energizing relay RL1 and motor 8.

With the window being fully closed, the operation of switch 7 closing its contacts *7a* and *7c* applies the +B potential to the relay RL2 to energize the motor 8 in the downward or opening direction. The window comparator is switched to an open level and transistors TR4 and TR2 are turned on to hold the relay RL2. If the downward movement of the window is impeded by the occupant or when the window reaches the fully open position, the motor current increases to several tens of amperes, switching the window comparator to a low output state. As a result, the diode D2 becomes forwardly biased and the potential at the base of transistor TR4 finds a low impedance path through the diode D2. Transistors TR4 and TR2 are successively turned off to de-energize the relay RL2 and hence the motor 8.

Since the rain-drop signal is useless when the window remains closed, a disabling circuit is provided to remove power from the modulator circuit 30 and receiver circuit 40. This disabling circuit comprises a normally open pressure responsive switch 11 arranged to close its contacts when the window is fully closed, a relay RL3 and a resistor R13 all of which are connected in series between the terminal at +B voltage and ground. The disabling circuit is completed when the relay RL3 is operated in response to the window being closed and opens its first contacts S1 provided in a first power line which couples the +B potential through a terminal 85 to the modulator 30 and the receiver 40 and opens its second contacts S2 provided in a circuit coupled from the output of the window control circuit 50 to the window motor control circuit 60.

A manually operated auto-to-manual changeover switch MS having a pair of ganged contacts $ms_1$ and $ms_2$ is further provided in the power circuits just described to disable the automatic operation of the window control system and operate the window regulator in manual mode.

For purposes of visually indicating that the window is moving in either direction, an operational amplifier Q3 is provided having its noninverting input coupled to the output of the window comparator and its inverting input coupled to receive a reference potential derived from a junction between resistors R10 and R11 which are connected in series between the +B terminal and grund. When the window comparator is in an open level state during the window movement, the amplifier Q3 switches to a high output state to turn a light-emitting diode 12.

It is preferable that the raindrop sensor 10 be mounted within the wiping area of a windshield wiper 13, FIG. 1, and the wipers 13 and 14 are operated in response to the raindrop signal. Since the raindrops within the wiping area are cleared by the wiper, the portion of the windshield where the raindrop sensor is mounted is quickly dried up as soon as the rainfall ceases, so that the raindrop sensor instantly resumes its operation. Furthermore, it is preferable that once the window has been closed in response to a rain fall the power circuit of the window control system be turned off to prevent it from responding to the raindrop signal which is interrupted each time as the raindrops are cleared by the wiping action while permitting the wiper to remain responsive to it.

Figure 6:
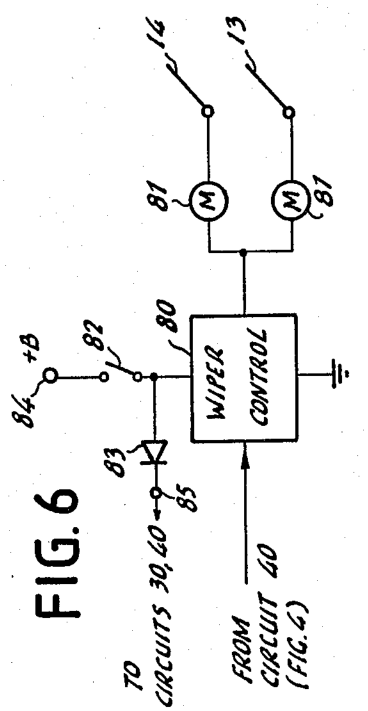
FIG. 6 is an illustration of a wiper control circuit.

For this purpose, the circuit of FIG. 5 is modified as shown in FIG. 6. A wiper control circuit 80 is shown connected to the output of the comparator Q*4a* of the receiver circuit 40 to drive wiper motors 81 which in turn activate the wipers 13 and 14. The control circuit 80 is powered through a manually operated power switch 82 from a terminal 84 at +B potential. This potential is further coupled by through a second power line including a diode 83 to the power supply terminal 85 of the circuits 30 and 40. When it starts raining, the raindrop signal from the comparator Q*4a* operates the window control circuit 50 to close the window. Upon the full closure of the window, the pressure responsive switch 11 is operated to energize the relay RL3 to disconect the first power line of the circuits 30 and 40. However, the circuits 30 and 40 receive power through the diode 83 of the second power line to continue the raindrop signal to be supplied to the wiper control circuit 80.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A control system for a motor vehicle having a windshield, comprising:

first means mounted on the inner surface of said windshield at one end of a section thereof for emitting a beam of radiation into said windshield at an angle in the range between the critical angles of said windshield with respect to air and water to a normal to the windshield inner surface so that the beam totally internally reflects off the outer surface of the windshield in the absence of water on the windshield outer surface and partially reflects off said outer surface in the presence of water on the windshield outer surface;

second means mounted on the windshield inner surface at the other end of said section for detecting and converting said reflected beam into a first signal;

third means for comparing said first signal with a reference value to generate a second signal indicative of the presence of said water sufficient to warrant that a window of said vehicle be closed; and fourth means, responsive to said second signal, for closing said window.

2. A control system as claimed in claim 1, further comprising means for modulating the intensity of said beam at a predetermined frequency, filter means tuned to said predetermined frequency for passing said first signal therethrough and means for converting the output of said filter means into a DC signal as said first signal.

3. A control system as claimed in claim 1, further comprising manually operated switching means having first and second circuit conditions for opening and closing said window, respectively, wherein said fourth means comprises:

a reversible motor for driving said window in closing and opening directions in response to said first and second circuit conditions, respectively;

means for detecting when a current flowing though said motor is higher than a predetermined value to generate an output signal;

first control means responsive to said second signal and to said first circuit condition for energizing said motor in said window closing direction and responsive to said output signal for de-energizing said motor; and second control means responsive to said second circuit condition for energizing said motor in said window opening direction and responsive to said output signal for de-energizing said motor.

4. A control system as claimed in claim 1, wherein said first and second means are mounted within the wiping area of a wiper blade.

5. A control system as claimed in claim 1, further comprising means for indicating when said motor is being energized.

6. A control system as claimed in claim 1, further comprising window-operated switching means operated in response to said window being moved to a fully closed position for disconnecting a circuit through which power is applied to said first, second and third means.

7. A control system as claimed in claim 3, further comprising window-operated switching means arranged to be operated in response to said window being moved to a fully closed position for disconnecting a circuit through which power is applied to said fourth means.

8. A control system as claimed in claim 7, further comprising second manually operated switching means connected in series with said window-operated switching means for disconnecting said circuit.

9. A control system as claimed in claim 1, wherein said first and second means are mounted within the wiping area of a wiper blade, further comprising window-operated switching means arranged to be operated in response to said window being moved to a fully closed position for disconnecting a circuit through which power is applied to said fourth means, and means for driving said wiper blade in response to said second signal.

10. A control system for a motor vehicle having a windshield and a motor driven window, comprising:

a reversible motor for driving said window in closing and opening directions;

manually operated switching means having first and second circuit conditions;

a control circuit having a first input terminal responsive to said first circuit condition and to a window closing signal applied thereto for driving said motor in a window closing direction and a second input terminal responsive to said second circuit condition for driving said motor in a window opening direction;

energy emitting means mounted on the inner surface of said windshield at one end of a section of the windshield for emitting a beam of radiation into said windshield at an angle in the range between the critical angles of said windshield with respect to air and water to a normal to the windshield inner surface so that the beam totally internally reflects off the outer surface of the windshield in the absence of water on the windshield outer surface and partially reflects off said outer surface in the presence of water on the windshield outer surface;

means for modulating the intensity of said radiation at a predetermined frequency;

energy receiving means, mounted on said inner surface at the other end of said section, for receiving the reflected beam to generate a first signal;

filter means, tuned to said predetermined frequency, for passing said first siganl therethrough; and means for detecting when said first signal reaches a reference level to apply a second signal as said window closing signal to the first input terminal of said control circuit.

11. A control system as claimed in claim 10, further comprising means for driving a wiper blade of said windshield in response to said second signal.

12. A control system as claimed in claim 11, wherein said energy emitting and receiving means are mounted within the wiping area of said wiper blade, further comprising window-operated switching means arranged to be operated in response to said window being moved to a fully closed position for disconnecting a power circuit through which power is applied to said control circuit.

13. A control system as claimed in claim 12, further comprising second manually operated switching means connected in series with said window-operated switching means for disconnecting said power circuit.

14. A control system as claimed in claim 11, wherein said control circuit comprises:

means for detecting when a current flowing through said motor is higher than a predetermined value to generate an output signal;

first circuit means responsive to said second signal and to said first circuit condition for energizing said motor in said window closing direction and responsive to said output signal for de-energizing said motor; and second circuit means responsive to said second circuit condition for energizing said motor in said window opening direction and responsive to said output signal for de-energizing said motor.

15. A control system as claimed in claim 14, wherein said first circuit means comprises a first relay having a coil energized in response to said first circuit condition and to said second signal and relay contacts for closing a circuit for said motor to flow a current in a first direction, and a first relay holding and releasing circuit for holding said first relay energized in response to said first circuit condition and to said second signal and releasing said first relay in response to said output signal, and wherein said second circuit means comprises a second relay having a coil energized in response to said second circuit condition and relay contacts for closing a circuit for said motor to flow a current in a second direction, and a second relay holding and releasing circuit for holding said first relay and for holding said second relay in response to said second circuit condition and releasing said second relay in response to said output signal.

16. A control system as claimed in claim 10, further comprising window-operated switching means responsive to said window being moved to a fully closed position for disconnecting a circuit through which power is applied to said modulating means, said filter means and said detecting means.

17. A control system for a motor vehicle having a windshield with a motor-driven wiper for wiping said windshield and a motor-driven window, comprising:

a raindrop sensor mounted on the inner surface of said windshield within the wiping area of said wiper, the sensor including means for emitting a beam of radiation into a section of said windshield at an angle in the range between the critical angles of said windshield with respect to air and water to a normal to the windshield inner surface so that the beam totally internally reflects off the outer surface of the windshield in the absence of water on the windshield outer surface and partially reflects off said outer surface in the presence of water on the windshield outer surface, and means for receiving said beam to generate a first signal;

a reversible motor for driving said window in opposite directions;

a comparator for generating a second signal when said first signal reaches a predetermined value;

a window control unit including manually operated switching means having first and second circuit conditions, means for energizing said motor in a direction to close said window in response to said first circuit condition and said second signal and energizing said motor in a direction to open said window in response to said second circuit condition, and means responsive to said window being fully closed for disabling said motor energizing means; and a wiper control unit responsive to said second signal for operating said wiper.

18. A control system as claimed in claim 17, further comprising means for modulating the intensity of said radiation at a predetermined frequency and filter means tuned to said predetermined frequency for filtering said first signal, and means for integrating the output of said filtering means, the output of said integrating means being coupled to said comparator for comparison with said predetermined value.

19. A control system as claimed in claim 17, wherein said window control unit comprises a window comparator for comparing a voltage proportional to a current flowing through said motor with low and high reference levels for generating a first comparator output when said voltage lies between said low and high reference levels and a second comparator output when said voltage is lower than said low reference level or higher than said high reference level, said motor energizing means being responsive to said first comparator output to continue to energize said motor and responsive to said second comparator output to discontinue the energization of the motor.

* * * * *